(12) United States Patent
Brooks, Jr. et al.

(10) Patent No.: US 7,216,098 B1
(45) Date of Patent: May 8, 2007

(54) ELECTRONIC TRANSMISSION AND TRACKING OF DEPOSIT INFORMATION

(75) Inventors: William F. Brooks, Jr., Montchanin, DE (US); Peter J. Rushie, III, Wilmington, DE (US); Denis duPlanti, Middleton, DE (US)

(73) Assignee: AT Systems, Inc., Pasadena, CA (US)

( * ) Notice: Subject to any disclaimer, the term of this patent is extended or adjusted under 35 U.S.C. 154(b) by 433 days.

(21) Appl. No.: 09/693,565

(22) Filed: Oct. 20, 2000

(51) Int. Cl.
*G06F 17/16* (2006.01)
(52) U.S. Cl. .......................................... 705/30; 705/16
(58) Field of Classification Search ................ 705/16, 705/18, 21, 30; 235/7 R, 379, 383, 10, 12, 235/17
See application file for complete search history.

(56) References Cited

U.S. PATENT DOCUMENTS 6,067,530 A * 5/2000 Brooks et al. ................ 705/30

FOREIGN PATENT DOCUMENTS

DE 4323765 A-1 * 1/1995

OTHER PUBLICATIONS

Affinity Technology Group and Mosler Sign Distribution Agreement; PR Newswire, p. 1205, Dec. 5, 1996.*

* cited by examiner

*Primary Examiner*—Elaine Gort
(74) *Attorney, Agent, or Firm*—Christie, Parker & Hale, LLP

(57) ABSTRACT

A cash control system for a business establishment having one or more cash registers includes a safe assembly. The safe assembly includes a safe for securing cash and a currency reader coupled to the safe for determining the amount of cash received in the safe. A central control unit is configured to receive deposit information from the safe assembly and to generate and transmit deposit reports. Preferably, the central control unit also transmits identifiers that distinguish deposit information accumulated during an accounting period before a predetermined event and deposit information accumulated during the accounting period after the predetermined event. The cash information server is configured to receive the deposit information and the identifiers from the central control unit and to identify the amount of cash collected by the business establishment during the accounting period. Preferably, the cash information server is located off-site from the safe assembly.

15 Claims, 5 Drawing Sheets

ELECTRONIC TRANSMISSION AND TRACKING OF DEPOSIT INFORMATION

BACKGROUND OF THE INVENTION

The present invention relates generally to drop safe systems and methods, and more particularly, to a system and method of tracking cash deposited into and withdrawn from a safe for a given work day using an electronic transmission of deposit information to a cash information server.

Business establishments, e.g., convenience stores, perform numerous business transactions on a daily basis. Cash, in the form of coins, paper money, checks and so on, is often exchanged during these business transactions. To reduce the threat of theft of the cash, the cash is often deposited into a safe. Cash is deposited directly into the safe via slots ("cash drop") or by first placing the cash into envelopes and then placing the envelopes into the safe via slots ("envelope drop"). Thus, cash is deposited without having to open the safe and, as a result, the threat of theft is reduced. However, the amount of cash deposited into the safe is not yet verified by management. Accordingly, when the business establishment wants to determine the amount of cash deposited in a given working day, the safe must be opened and the cash counted. As a result, once the safe is opened, the threat of theft is greatly increased.

Also, traditionally, operators of the safe, e.g., store managers or business owners, remove the cash and complete a deposit ticket. The deposit ticket includes information regarding the cash removed. The deposit ticket is provided with the cash both of which are transported to a bank. The bank upon receipt of the cash, reconciles the actual cash transported with the information regarding the cash transported as indicated on the deposit ticket. The bank inputs the information regarding the cash transported and appropriately updates the business account to reflect the cash transported and deposited. Thus, time is lost in counting cash, locating discrepancies, investigating shortages and preparing bank deposits.

Electronic drop safes configured with bill validators that count cash as it is collected reduces the amount of time required to count cash. Also, compiling information regarding the cash received, such as determining how much money was collected during a shift, assists in locating discrepancies, investigating shortages and preparing bank deposits. However, problems still arise in balancing a store's actual daily sales receipts with the amount of cash in the safe because the cash in the safe is typically withdrawn at times that do not coincide with the end of a business day. Therefore, cash from more than one business day is co-mingled in the safe, which requires special attention. Accordingly, a need still exists for a system that tracks deposit information to permit prompt reconciling of daily sales receipts against cash deposited into the safe.

SUMMARY OF THE INVENTION

The present invention is embodied in a cash control system that tracks deposit information to permit prompt reconciling of daily sales receipts against cash deposited into the safe. The cash control system includes a safe assembly including a safe for securing cash and a currency reader coupled to the safe for determining the amount of cash received in the safe. A central control unit is configured to receive deposit information from the safe assembly and to generate and transmit deposit reports concerning deposit information accumulated during an accounting period (e.g., a business day). The central control unit can also transmit identifiers that distinguish deposit information accumulated during an accounting period before a predetermined event, e.g., an armored car cash pickup, and deposit information accumulated during the accounting period after the predetermined event. A cash information server is configured to receive the deposit information and the identifiers from the central control unit and to identify the amount of cash collected by the business establishment during the accounting period.

In alternative embodiments, the cash control system can include a printer with a bar code generator coupled to the central control unit and/or a MICR line reader coupled to the central control unit to read MICR line information. The central control unit may be configured to transmit the MICR line information to the cash information server.

In another embodiment, the cash control system includes at least one additional safe assembly including a safe for securing cash and a currency reader coupled to the safe for determining the amount of cash received in the safe. The central control unit is preferably configured to receive deposit information from the additional safe assembly and to transmit deposit reports to the cash information server containing deposit information received from the additional safe assembly.

In another embodiment, the safe is associated with a unique number which is included in the deposit reports transmitted by the central control unit. The central control unit may also be configured to identify when the safe is opened and the cash stored in the safe is removed.

In another embodiment, the identifiers are a sequence number and an alternate sequence number. The central control unit may be configured to adjust the sequence number and the alternate sequence number based on cash being removed from the safe. The central control unit may be configured to change one of the sequence number and the alternate sequence number at the time cash is removed from the safe and to change the other of the sequence number and the alternate sequence number at the end of the business day. The central control unit can also be configured to transmit a first deposit report that identifies deposit information for the business day up to the time of removal of cash from the safe. Preferably, the sequence number and alternate sequence number are different on the first deposit report. The central control unit can also be configured to transmit a second deposit report that identifies deposit information for the business day starting from removal of cash from the safe. Preferably, the sequence number and the alternate sequence number on the second deposit report are the same.

A method of monitoring cash deposited and removed at a business establishment having one or more cash registers and using a cash control system is also described herein. The method includes collecting cash at a cashier's station through sales transactions. Some of the cash from the sales transactions is secured into the cash control system. Deposit information is determined based on the cash secured and the deposit information is transmitted to an off-site location. The deposit information may then be reconciled to the collected cash based on information transmitted to the off-site location. The deposit information may be transmitted from the off-site location to corporate offices of the business establishment, or alternatively, a website may be updated with the deposit information and the deposit information accessed from the website.

Other features and advantages of the present invention will become apparent from the following description of the preferred embodiments, taken in conjunction with the accompanying drawings, which illustrate, by way of example, the principals of the invention.

DETAILED DESCRIPTION

Figure 1:
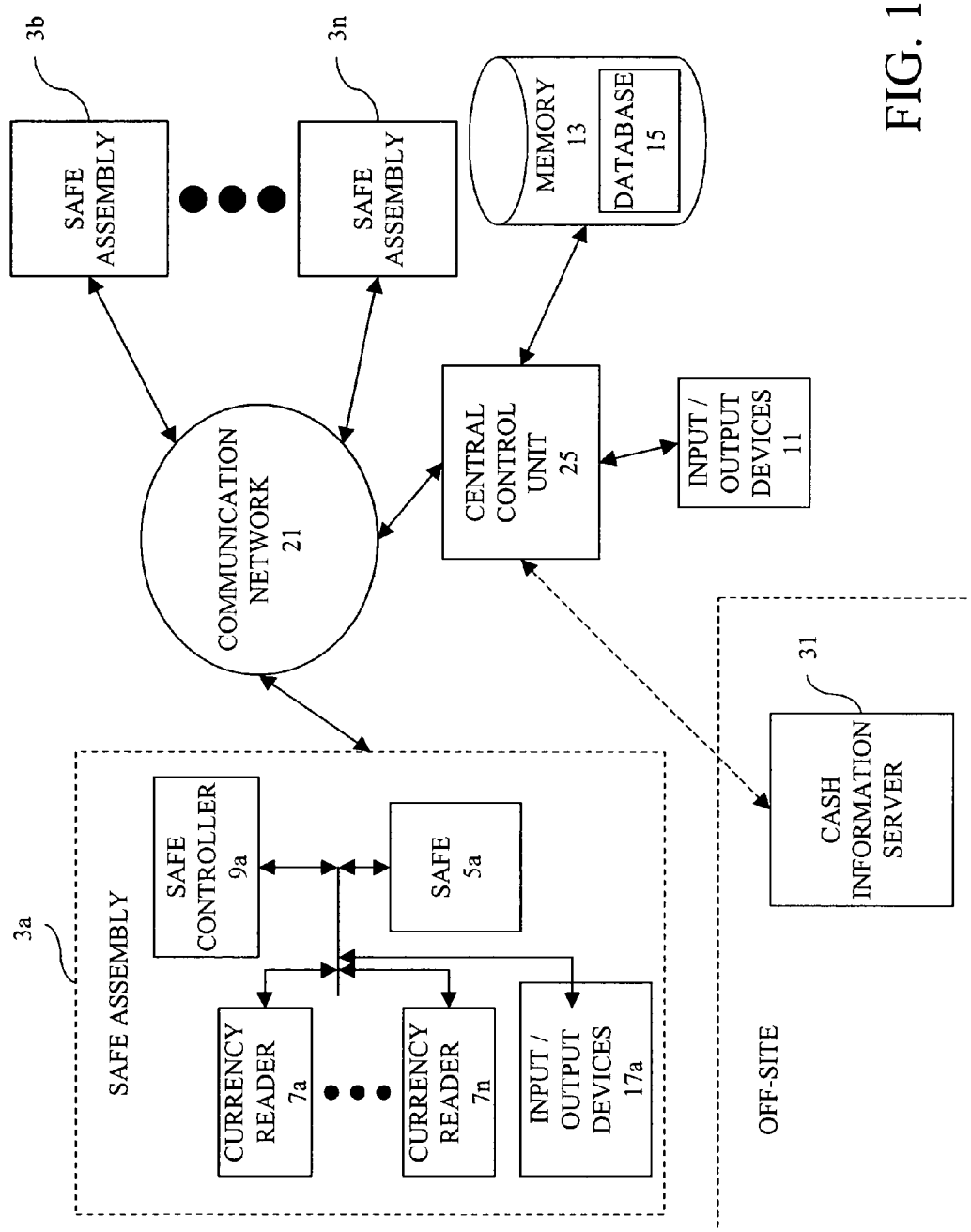
FIG. 1 illustrates a block diagram of one embodiment of the cash control system of the present invention.

In FIG. 1, a cash control system of the present invention includes a safe assembly 3a, a central control unit 25, an off-site cash information server 31 and a communication network 21. The safe assembly 3a is configured to receive cash and track the cash received. One such example of a safe assembly is described in U.S. Pat. No. 6,067,530, issued May 23, 2000, the disclosure of which is incorporated by reference herein. In one embodiment, the cash control system includes additional safe assemblies 3b–3n. In this embodiment, the safe assemblies are numerous and dispersed throughout a business establishment, e.g., a convenience store. The business establishment includes one or more cash registers. In one embodiment, a cash register is coupled to a safe assembly or provided next to a safe assembly. Each safe assembly is coupled to the communication network 21.

The central control unit 25 which is described in more detail later is also coupled to the communication network. As such, the communication network 21 provides bi-directional communication between the safe assemblies and the central control unit 25. In one specific embodiment, the communication network 21 is a computer network that includes network devices such as routers, switches or repeaters, and Ethernet cables.

The central control unit is also coupled to the cash information server 25 (which is described in more detail later) located at another location (preferably, a central processing location of an armored car service, or other central processing location). Bi-directional communication between the central control unit and the cash information server is performed. For example, in one embodiment, the central control unit includes a modem used to call or receive a call from the cash information server in order to send and/or receive information between the two units. The cash information server, likewise, includes a modem used to call or receive a call from the central control unit in order to send and/or receive information between the two units. Alternatively, the cash information server is coupled to the communication network and/or the central control unit via one or more of the network devices described above. The communication network may also include integrated services digital network (ISDN) lines, digital subscriber lines (DSL), cable lines, and wireless connections such as radio frequency transmission and satellite transmission. The communication network 21 is, in various alternative embodiments, a computer network, such as a local area network (LAN), wide area network (WAN), the Internet, a television network or a conventional telephone system (POTS).

The safe assembly 3a includes a safe 5a that stores cash, including, but not limited to, coins, paper money, checks, food stamps and other forms of currency. The safe is coupled to one or more currency readers 7a–7n. A currency reader, for example, is a bill validator. In the described embodiment, a currency reader is configured to receive and recognize one or more types of currency. In one embodiment, upon receipt of the currency, the currency reader identifies the denomination of the received currency. Preferably, the currency reader, upon identifying the received currency, deposits the currency into the safe 5a. Currency information, i.e., information regarding the currency deposited, is then communicated from the currency reader to a safe controller 9a.

Preferably, an input device 17a, e.g., a controller keypad, is attached to the safe 5a or included as part of the safe 5a. The input device allows an operator, e.g., a cashier, to communicate with the safe assembly. In other embodiments, the input device includes a keyboard, a point-of-sale device, e.g., a cash register, or a computing device, such as a handheld computer or a personal computer attached to the safe via a serial port, parallel port, infra-red port, wireless port and/or a network port.

In one embodiment, information is provided by an operator, e.g., the cashier, via the input device. For example, hot keys are provided with the input device. Hot keys are "one key" inputs of access codes or personal identification numbers that identifies a particular cashier. For instance, the cashier, having an access code of "5281", may press the hot key labeled "A" which enters the access code of "5281" without the cashier having to enter each digit. Once the access code is provided to the safe controller via the input device, the safe controller identifies the cashier by associating a unique cashier identification number to the cashier. Hence when the cashier deposits the cash into the safe 5a via a bill validator, the safe controller receives cash information and associates the cash information with the cashier. Therefore, the safe controller "knows" how much cash was deposited into the safe and by whom. The safe controller, in one embodiment, also identifies a date and time in which the cash was deposited. When multiple safe assemblies are used, the system can be set up so a cashier would use the same hot key across the network. Alternatively, the hot keys can be programmed to a single cashier at each safe assembly.

The cashier can also provide his/her access code using input devices that include, but are not limited to, voice recognition devices, magnetic card readers and biometric devices. Also, via the input device, an operator is able to enter information regarding the contents of an envelope that contains currency. The safe controller based on the entered information determines the currency information, i.e., information regarding the currency placed in the envelope. For instance, the currency information includes the total amount of currency placed in the envelope, the specific number and denomination of the currency placed in the envelope, a date and a cashier identification number.

The safe controller, in one embodiment, associates a predetermined unique safe number with the safe 5a. The safe number uniquely identifies each safe and thus distinguishes one safe from another safe. The safe controller also associates the cash information with the unique safe number to also identify and distinguish cash deposited in one safe from cash deposited in another safe.

The safe controller transmits the cash information to the central control unit 25. The central control unit, in one embodiment, is a stand alone computing device located in the business establishment that receives information transmitted by each of the safe assemblies.

In one embodiment, the safe controller, along with the cash information, transmits the unique safe number, a shift number and/or an operator identifier, e.g., the cashier identification number. The central control unit stores the information transmitted by the safe controller with a date and time stamp in a database 13. Alternatively, the date and time stamp is determined and transmitted by the safe controller. The database 13 is stored in memory 15 coupled to the central control unit. The database includes a series of records. In one embodiment, multiple cash records are created and included in the database. Each cash record contains the information transmitted by the safe controller which includes, but is not limited to, cash information, a unique safe number, a date and time stamp, a shift number and/or an operator identifier, e.g., a cashier identification number.

Another input device, such as a check reader, e.g., a magnetic ink character recognition (MICR) reader, is also coupled to the central control unit 25. The MICR reader captures the MICR line which identifies creditor information pertaining to a check, e.g., a bank branch number or a bank account. An operator, e.g., a store manager, enters the amount of the check via a keypad. This check information is transmitted to the central control unit. The central control unit transmits the check information (the MICR line or equivalent plus amount) to the cash information server which can transmit the check information to a bank. The bank can use the check information to clear the check and thus debit the checking account associated with the check. Preferably, the central control unit generates a cash record based on information provided by the MICR line and by the operator.

Alternatively, a check reader is included as an input device with each safe assembly. The check reader and the operator, e.g., a cashier, respectively, identify the information pertaining to a check (the MICR line) and the check's amount which is communicated to the safe controller. The safe controller transmits this check information to the central control unit 25. The central control unit generates a cash record based on received check information. The central control unit also transmits the check information to the cash information server which transmits the check information to a bank in order for the bank to clear the check.

Using an input device, an operator, e.g., a store manager, also identifies the end and/or beginning of a business day. For example, the store manager presses a hot key or swipes a card key to signify that a business day has ended. Alternatively, a calendar/clock determines the end of a business day. At the end of a business day, the central control unit collects the cash records generated for the business day to generate a deposit report. The deposit report, in one embodiment, includes a customer identification code, a date and time, number of envelope drops, and the amount of cash in the envelopes, such as the amount and/or number of checks deposited and the number and/or amount of food stamps collected. A tracking identifier and an alternate tracking identifier are also included with the deposit report. Based on whether cash has been withdrawn from the business establishment, e.g., by an armored car service, the central control unit adjusts at least one of the tracking identifiers associated with the deposit report. This process is described in more detail in reference to FIGS. 4 and 5.

At the end of a business day, the central control unit transmits the deposit report or reports to the cash information server. The central control unit, in one embodiment, stores each deposit report as a data file and sends each data file via one or more electronic mails to the cash information server. In one embodiment, the data files or the electronic mails are compressed and/or encrypted prior to transmission.

The cash information server is a computing device, such as a server, workstation, or personal computer, located externally from the business establishment, e.g., at an armored car service headquarters. The cash information server warehouses or stores the deposit reports provided by the central control unit. In other words, the cash information server receives and stores the electronic mails from the central control unit.

In one embodiment, a cash database server (not shown) is coupled to the cash information server. The cash database server is a computing device, such as a server, workstation, or personal computer, located externally from the business establishment, e.g., at an armored car service headquarters. The cash information server sends the deposit reports to the cash database server. Preferably, the cash database server parses the information in the deposit reports into categories, such as cash, food stamps, checks, and envelope cash. The cash database server creates and stores individual deposit records for each category of information in a database.

Figure 2:
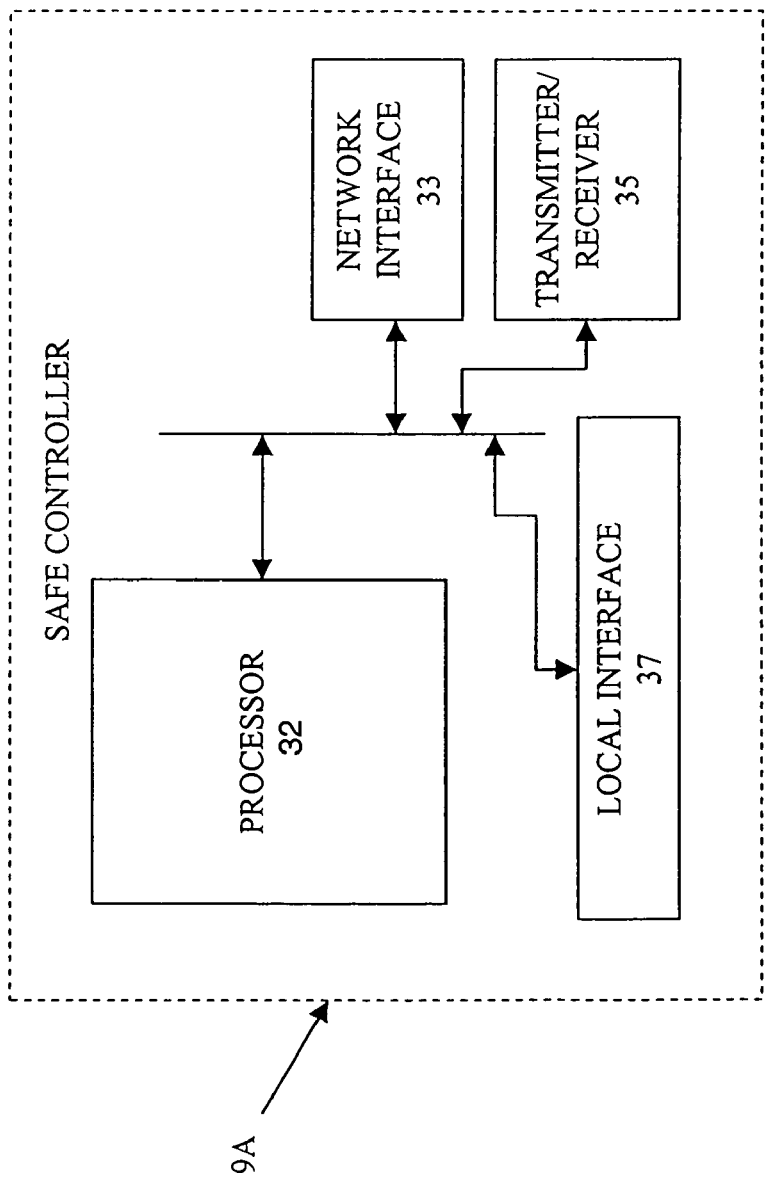
FIG. 2 illustrates a block diagram of one embodiment of a safe controller of the present invention.

Referring to FIG. 2 in conjunction with FIG. 1, the safe controller includes a network interface 33, a transmitter/receiver 35 and a local interface 37. The network interface couples the safe controller to the communication network 21. The transmitter/receiver provides a direct connection between the safe controller and the central control unit. The local interface couples the safe controller to the safe and the cash readers 7a–7n and the input device(s) 15a. In one embodiment, the local interface couples the safe controller to other input devices that receive cash, such as vending machines with bill validators and other devices that provide articles of value, such as lottery-ticket vending machines, telephone calling card machines, money order machines and postage machines. In one embodiment, the local interface couples the safe controller to a cash dispenser, such as a coin dispenser or an automated teller machine, attached to a safe assembly. An example of a coin dispenser is described in U.S. Pat. No. 4,940,162, filed Oct. 17, 1988, the disclosure of which is incorporated by reference herein. In an alternate embodiment, the coin dispenser is included in at least one of the safe assemblies 3a–3n.

The safe controller also includes a processor 32. The processor or micro-controller is configured to identify the cash information provided by the cash reader. For example, the processor receives cash information from the cash reader via the local interface and transmits the cash information to the central control unit. The processor 32 also monitors the condition of the safe. For example, the processor identifies when the safe is opened and closed or when an error or problem occurs in a cash reader and transmits this information to the central control unit 25 (FIG. 1).

In one specific example, but not limited to this example, the safe controller is an internal control board. The internal control board is coupled to bill acceptors and "hot keys" as previously described. Optionally, a door switch is also coupled to the internal control board to identify when the safe door is opened and closed. Furthermore, an electronic lock is also optionally coupled to the internal control board to lock and unlock the safe. The internal control board also includes a microcomputer coupled to communicate to the central control unit. In one specific example, but not limited to this example, a cable connects the internal control board and the central control unit via a multidrop RS485 bus. The central control unit associates each internal control board and, in one embodiment, each safe assembly with a unique identification code or address. In one specific example, but not limited to this example, the internal control board identifies each internal control board with a unique identification code based on the internal control board's location or connection on the RS485 bus.

The central control unit 25 may be designed in a similar manner as the safe controller 9a. Thus, the central control unit includes a network interface, a transmitter/receiver, a local interface and a processor. The network interface couples the central control unit to the communication network 21 and thus to the safe assemblies and the cash information server 31. The transmitter/receiver provides a direct connection between the central control unit and the cash information server. The local interface couples the central control unit to a check reader 19 and memory 15. In one embodiment, the central control unit, like the safe controller, is coupled to currency readers 7a–7n and input device 15a via the local interface. In one embodiment, the local interface couples the central control unit to other input devices that receive cash, such as vending machines with bill validators and devices that provide articles of value, such as lottery-ticket vending machines.

Preferably, the central control unit 25 and/or the safe controller 9a are operationally coupled to an output device 11 (FIG. 1), such as a printer, liquid crystal display (LCD), cathode ray tube (CRT), and other types of displays or hardcopy production devices, via the local interface. The display or hardcopy provides a visual or paper representation of the deposit information. In one embodiment, the armored service that removes the deposited cash provides an output device that operationally couples to the central control unit and/or the safe controller via the local interface. The output device from the armored service can thereby receive the deposit information.

In one embodiment, the output device, operationally coupled to the central control unit and/or the safe controller, generates a receipt that includes a deposit bar code. The deposit bar code is an encoded representation of the deposit information. As such, a deposit bar code reader configured to interpret the deposit bar code is required to generate a visual or paper representation of the deposit information. The deposit bar code on a receipt allows deposit information to be rapidly and accurately transferred from a business establishment to a cash information server, e.g., a money room computer of an armored car service or a bank. The bar code deposit information can then be compared to the amount of cash actually picked up from the store after it has been counted.

In one embodiment, the central control unit and/or the safe controller, via the transmitter/receiver or the network interface, receives commands from an external source, such as the cash information server, to perform maintenance on the central control unit and/or the safe controller or to update or modify control software. Control software includes, but is not limited to, instructions and data used by the central control unit, the safe controller, the cash readers and so on to perform their respective functions. Alternatively, the central control unit and/or the safe controller, via the local interface, may receive commands from an external source, such as a handheld computer to perform maintenance or to update or modify the control software.

In one embodiment, the central control unit is a control board including a microcomputer. In one specific example, but not limited to this example, the microcomputer is coupled via an RS485 bus. The microcomputer controls the operation of each safe assembly, such as locking or unlocking a safe. The control board may be also coupled to a keypad to receive information from a cashier and a display and a printer to provide feedback to the cashier. As such, in one embodiment, a user interface that includes a display, a keypad and touch memory is coupled with the control board.

A communication device, e.g., a modem, is also coupled to the control board to transmit information collected by the control board to a central office, such as an armored car service headquarters. In another embodiment, flash memory and/or touch memory is also coupled to or included on the control board. The flash memory includes software and/or data utilized by the microcomputer. A touch memory is a mobile memory chip that communicates by touch. In one example, but not limited to this example, the touch memory identifies or stores cashier identification numbers or data, such as deposit reports. Optionally, serial ports are included on the central control unit to allow additional output devices, such as printers or displays, input devices, such as keyboards or check readers, computing devices, such as handheld computers, or communication devices, such as modems to be coupled to the control board.

Figure 3:
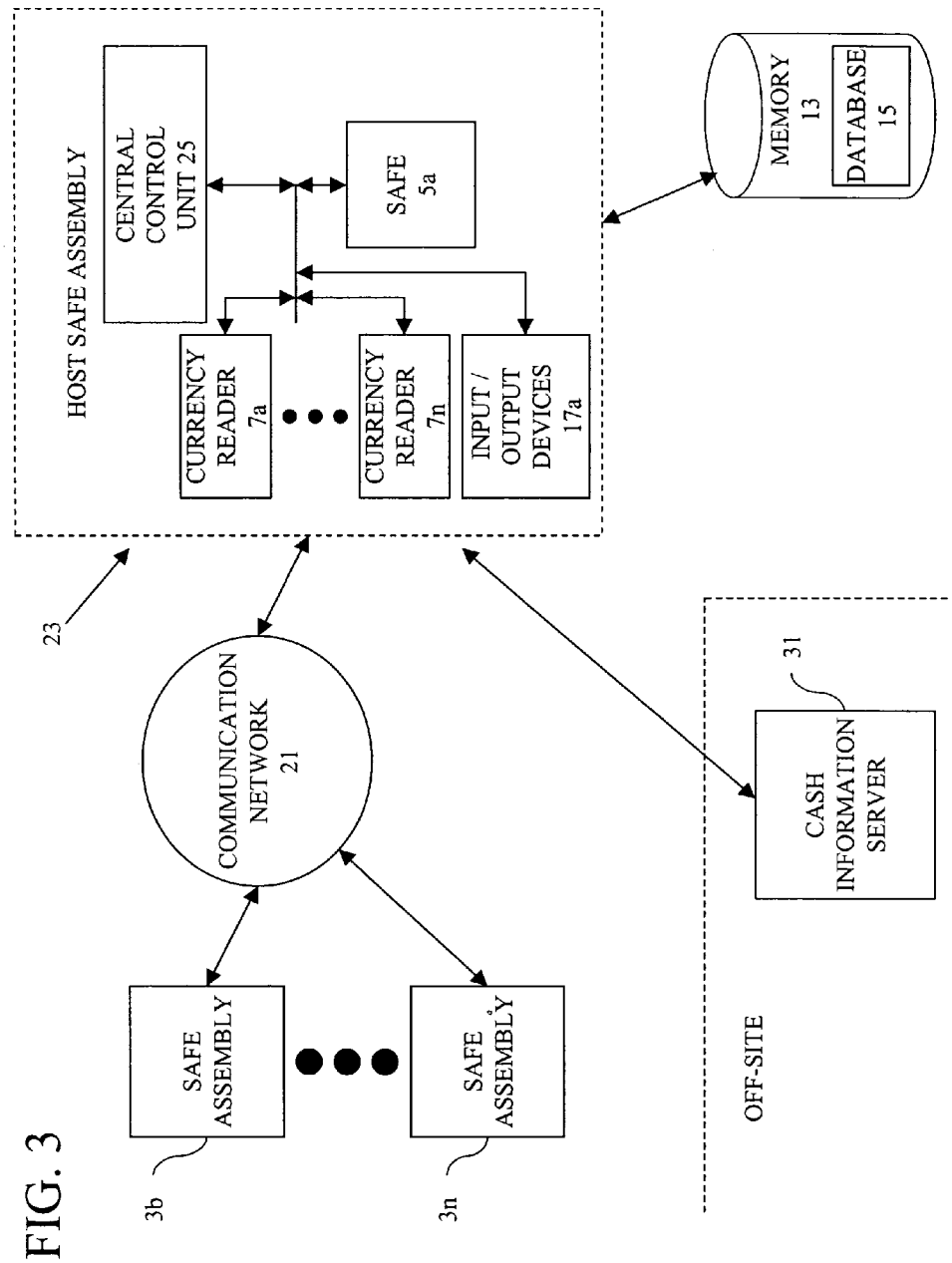
FIG. 3 illustrates a block diagram of one embodiment of the cash control system of the present invention.

In FIG. 3, another embodiment of the cash control system of the present invention is shown. In FIG. 3, devices and components corresponding to those already represented and described in FIG. 1 are indicated by the same reference numerals. The cash control system includes a host safe assembly 23. The host safe assembly combines the functionality and devices and/or components of the central control unit 25 (FIG. 1) and the safe assembly 3a (FIG. 1). As such, the host safe assembly receives and stores cash to generate cash records. However, instead of transmitting cash records, the host safe assembly stores the cash records in database 15. The host safe assembly also receives cash records from safe assemblies 3b–3n. The cash records are compiled as a deposit report and transmitted to the cash information server 31.

The safe assemblies of FIG. 3, are similar to the safe assemblies described in FIG. 1. Some of the safe assemblies include memory that stores cash records and a processor that compiles the cash records to generate deposit reports. Each deposit report from each safe assembly is transmitted to the host safe assembly. The host safe assembly combines each deposit report from each safe assembly with the cash records from the other safe assemblies to create a deposit report. An example of a new safe assembly is described in an application entitled "Loose Coin And Rolled Coin Dispense", U.S. patent application Ser. No. 09/692,802, filed Oct. 20, 2000, now abandoned, incorporated herein by reference.

Figure 4:
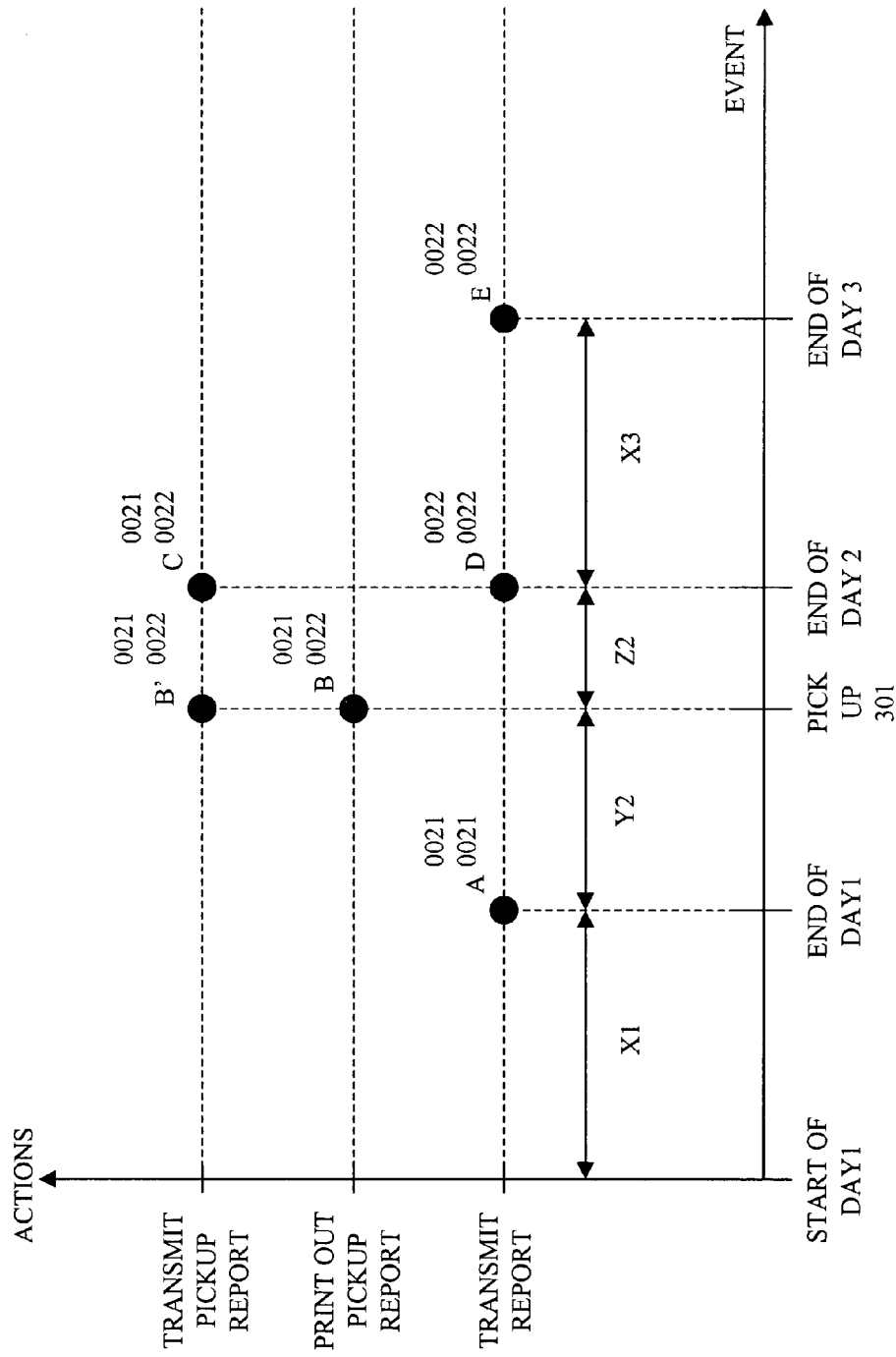
FIG. 4 illustrates an exemplary operational graph that includes time periods and indicators used in the tracking of cash collected and removed in the cash control system of the present invention.

In FIG. 4, an exemplary operational graph is shown that includes time periods and indicators used in the tracking of cash collected and removed using the cash control system of the present invention. Along the y-axis of the diagram, actions, such as transmitting a report (e.g., a deposit report), are illustrated. Along the x-axis of the diagram, events, such as successive days (determined by a store manager or a calendar/clock), are illustrated. In other embodiments, other time periods such as shift times, hours or weeks, may be used. During each successive day, cash is collected throughout the day. The cash is collected, for example, by a cashier and deposited into a safe assembly. Information regarding the cash is transmitted from the safe assembly to a central control unit.

At the end of each day, the information regarding the cash deposited during the day is transmitted from the central control unit to a cash information server via one or more E-mail messages. Other manners of transmission may also be used such as a dial up file transfer or as described previously. Preferably, a tracking identifier and alternate tracking identifier are included in each E-mail, along with the store's cash information, i.e., the store number and the information regarding the cash deposited.

A tracking identifier is an indicator, e.g., a sequence number, that associates the cash collected for a given time period. For example, a sequence number of 0021 and an alternate sequence number of 0021 are associated with cash collected throughout day 1. While cash is collected during the day, an external event, such as an armored pickup 301 in which cash is withdrawn from the safe assembly, may occur. If no armored pickup occurs, then at the end of day 1, point A, an E-mail is sent that includes sequence number 0021 and the alternate sequence number 0021. The E-mail also includes the store number and the cash information X1 pertaining to the cash collected during day 1.

However, if an armored pickup did occur during the day (e.g., during day 2), the alternate sequence number is incremented by one. Thus, at point B during day 2, the alternate sequence number becomes 0022. In one embodiment, a print-out is generated that includes the cash information, the store number, the sequence number and the alternate sequence number. The print-out is provided to the store manager as a receipt and a copy is kept by the armored car courier. The receipt provides an acknowledgment or proof that the cash in the safe assembly has now been withdrawn. The receipt also provides current cash information regarding the cash collected by the business establishment since the last armored pickup.

In other embodiments, the alternate sequence number may be adjusted in various other ways, such as increasing or decreasing by a predetermined constant or based on an arithmetic formula or function. In one embodiment, a particular code is utilized by an armored service to identify the armored service and open the safe. The central store processor recognizes this particular code and, thus the armored service, and adjusts the sequence numbers accordingly. Initially, in one embodiment, the sequence numbers are scanned in or determined by a deposit ticket. In another embodiment, the sequence numbers are initially determined by an operator entering a code via an input device.

Also, optionally, at point B', an E-mail is transmitted that includes sequence number 0021 and the adjusted alternate sequence number 0022. The E-mail also includes cash information Y2 pertaining to the cash collected during day 2 prior to the armored pickup.

At the end of day 2, point C, a first E-mail is preferably transmitted that includes sequence number 0021 and the adjusted alternate sequence number 0022. The first E-mail also includes cash information Y2 pertaining to cash collected during day 2 prior to the armored pickup. The sequence number is then adjusted to be identical to the alternate sequence number, i.e., 0022 and a second E-mail is transmitted that includes sequence number 0022 and the alternate sequence number 0022 (point D). The second E-mail includes cash information Z2 pertaining to cash collected during day 2 after the armored pick up. In this way, the two e-mails may be considered to determine the total cash dropped into the safe during day 2. Of course, other variations may be used to determine the amount of cash collected during day 2 and the amount of cash collected on day 2 before the pick up and the amount of cash collected on day 2 after the pickup.

At the end of day 3, since no armored pickup occurred, the sequence number and the alternate sequence number are not adjusted. Thus, the sequence number 0022 and the alternate sequence number 0022 are included with an E-mail that is transmitted at the end of day 3(point E). The E-mail also includes cash information X3 pertaining to the cash collected during day 3.

Thus, at the end of each business day, the sequence number and the alternative sequence number included in an E-mail are identical. However, if during the business day, cash has been withdrawn by an armored service, another E-mail is sent that includes a sequence number and an alternative sequence number that differ.

Preferably, the E-mails described above, in one embodiment, also include status indicators that notify the cash information server that a problem with the safe assembly has occurred. The cash information server as appropriate is able to dispatch a repair agent to investigate the problem. Error codes, in one embodiment, are included in the status indicators that allow the cash information server to distinguish or identify a problem prior to dispatching a repair agent. For instance, unique error codes are assigned to a specific portion or module in the safe assembly or a particular problem, such as identifying a faulty sensor, a jam in the currency reader or a software "crash".

Also, a store identifier, such as an unique store identification number, may be included in each E-mail. Thus, the cash information server and/or cash database server is able to associate the E-mails with a particular business establishment. Thus, the cash information server and/or cash database server act as a repository collecting the cash information for a particular business establishment. The collection of currency information may then be sent to or retrieved by the armored car service on its perspective customers. As such, with each E-mail sent and the cash information collected based on the E-mails sent, an auditing agent or a business executive agent is provided a breakdown of the amount of cash collected each day.

For example, an auditing agent can use the cash information to reconcile and/or verify that the cash picked up by an armored car service from the business establishment corresponds to the cash deposited in a bank. The auditing agent may be an employee of the armored car service or a corporate level employee of the store. For example, a daily record of cash information can be transmitted from the cash information server or cash database server to the corporate level employee on a daily basis at the store's corporate headquarters or other desired location. Accordingly, cash information is quickly routed from a store to the armored car service headquarters, to the store's headquarters or alternatively, directly from the store (through the central control unit) to store headquarters through the store's independent network (e.g., the store POS system, back office PC or satellite). At the store's headquarters, the auditing agent can verify that all cash rung up for the previous day (e.g., in the stores POS system) is reconciled against the cash information report. Similarly, shift reports or cashier reports may be prepared and routed for appropriate time periods to permit reconciliation during such time periods. Additional reports may also be sent to a corporate level employee of the store to verify that cash has been properly deposited by the armored car service with the store's bank. Alternatively, the armored car service can make the daily cash information or verified reports available on a website that may be accessed by a corporate level employee.

In another embodiment, several stores, each having a central control unit or host safe assembly that accumulates store information for a given day, are connected to the off-site cash information server to create an information network via electronic feeds from the individual stores. The cash information server accumulates all of the stores' business day revenues. The cash information server or related cash database server can then provide a report reflecting all stores' business day revenues on a daily basis to the stores' corporate headquarters via electronic feed or otherwise. Such reports permit reconciliation of the store cash receipts and/or verification of bank deposits.

In another example, the bank may use the cash information to allow immediate authorization or use of the cash withdrawn from the business establishment, before the cash is deposited in the bank. Furthermore, in one example, the business executive may use the cash information to immediately identify the cash withdrawn from the business establishment and thus identify and "ear-mark" the cash available to be used in purchasing merchandise or investing in other business endeavors. In addition, the bank may give the store credit for cash in the safe assembly based on the daily reports, even before a cash pick up has occurred.

In a further embodiment that does not involve armored car pickup, the store manager can scan a deposit ticket by utilizing a MICR reader built into a safe assembly. The MICR reader captures the unique serial number that is encoded on the deposit ticket, and the deposit ticket can be discarded. The central control unit can utilize this serial number in all of its daily reports that it sends to the off-site cash information server. The cash information server or related cash database server can consolidate the reports, send them as a batch to the store's headquarters. This process would preferably occur daily. When the store manager is ready to make a deposit to the bank he can scan another deposit ticket (which has it's own unique serial number) and prepare the deposit to go to the bank.

The reports that the central control unit sends to the cash information server each day preferably contains two sequence numbers, similar to that described above. On days when there is no money withdrawn for deposit to the bank the sequence number and the alternate sequence serial number are the same. On days when money is withdrawn for deposit to the bank, the sequence number would be that which has been used since the last withdrawal and the alternate sequence number would be the one that was last scanned by the MICR reader. Also, on the day a withdrawal is made there are actually two reports that are sent in the same file when the central control unit does its daily transmission. Using the fact that on withdrawal days the sequence number and the alternate sequence number are different on the first report and that the alternate sequence number is the same as the sequence number on the second report is what allows the store manager to understand which part of the money in the withdrawal belongs to which business date and to which deposit ticket.

The effect here is that the store manager can now reconcile the daily reports (using the unique sequence number) to the bank deposit (with the same unique serial number). The store manager is also able to balance actual store sales to the daily reports because the reports are based on the customer's business day (which matches the store computer system).

Figure 5:
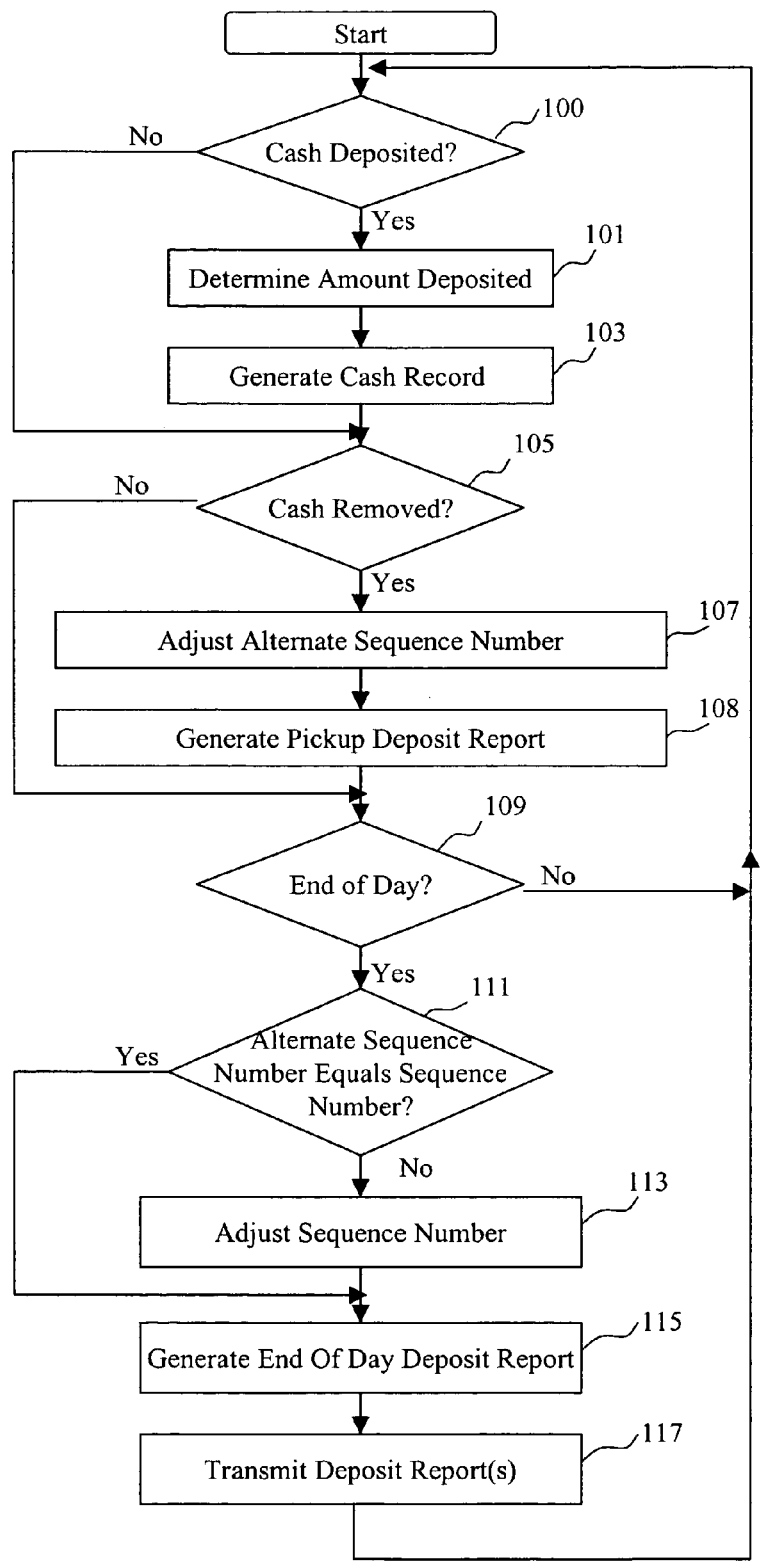
FIG. 5 illustrates a flow diagram of a process of tracking cash collected and removed in the cash control system of the present invention.

In FIG. 5, a process of identifying the cash that is collected in a business establishment using a cash control system is shown. In step 100, the central control unit determines if cash is being deposited into a safe assembly. If the central control unit determines that cash is being deposited, then in step 101, the central control unit determines information regarding the deposited cash. In one embodiment, the cash information includes the amount of cash deposited, the current date, the current time, and identifiers associated with a shift, a business day and/or an operator who deposited the cash. In step 103, the central control unit generates a cash record based on the cash information determined. If no cash is being deposited, the central control unit proceeds directly from step 100 to step 105 described below.

After checking for deposited cash and processing any deposited cash as described above, the central control unit proceeds to step 105. In step 105, the central control unit determines if cash is being removed from a safe assembly, e.g., if an armored service has opened a safe and removed the cash. If, in step 105, the central control unit determines that currency is being removed from a safe, the central control unit adjusts a predetermined alternate sequence number in step 107. In the described embodiment, the central control unit increments the alternative sequence number by one. After adjusting the alternate sequence number in step 107, the central control unit generates a pickup deposit report in step 108. The pickup deposit report details how much currency had been deposited in the safe prior to the cash removal. If no cash is being removed, the central control unit proceeds directly from step 105 to step 109 described below.

After checking for removed cash and processing any removed cash as described above, the central control unit proceeds to step 109. In step 109, the central control unit determines if it is the end of the day. In this embodiment, if the central control unit determines that a business day is not over, then the central control unit returns to step 100 and begins the process again by determining if cash is being deposited into a safe.

In step 109, if the central control unit determines that the end of the day has arrived, then the central control unit checks to see if the alternate sequence number equals the sequence number, in step 111. If the alternate sequence number does not equal the sequence number then currency has been removed from the safe and the central control unit adjusts the sequence number to match the alternate sequence number in step 113. If the alternate sequence number equals the sequence number, then the central control unit skips equalization step 113.

In an alternative embodiment, the pickup deposit report is not generated in step 108, but is generated after the central control unit determines that it is the end of the day in step 109. In the alternative embodiment, the central control unit generates the pickup deposit report prior to adjusting the sequence number in step 113.

Once the alternative sequence number equals the sequence number, the central control unit creates an end of day deposit report in step 115. In one embodiment, the deposit report includes a compilation of the cash records generated by the central control unit, in step 103, during the day. The deposit report also includes the predetermined sequence number and alternative sequence number. After the end of day deposit report is generated in step 115, the central control unit transmits all deposit reports to a cash information server in step 117.

Following transmittal of the deposit reports in step 117, the process returns to step 100, and begins the process again by determining if cash is being deposited into a safe. The process ends if the central control unit is commanded by an external input device to stop or a problem occurs in the central control unit or a safe assembly.

Attached as an Appendix are three reports, which give an example of the use of sequence numbers (i.e., serial number and alternate serial number). The Transaction by Business Date report shows amounts collected at end of day if there is no pickup (Mon. $6^{th}$) and amounts collected for the day before pickup and amounts collected for the day after pickup (Tues. $7^{th}$). The Daily File report, which contains information that could be sent to a store's corporate headquarters daily to reconcile cash received at POS stations, shows cash collected in the safe each day. Food stamps, manual drops and checks could also be reported. The Verified File report identifies amounts deposited in the bank by serial number. Note that all records having the same serial number together represent total cash in the safe at the time of pickup.

Even though the devices and/or components, described in reference to the safe assembly, the central control unit and the host safe assembly, are described as separate items, the devices and/or components could be combined as one or more devices and/or components. Also, the devices and/or components, described in reference to the safe assembly, the central control unit and the host safe assembly, could be included inside, outside, or a combination thereof, of the safe assembly, the central control unit and the host safe assembly, respectively.

Accordingly, the present invention provides a system and method of tracking cash deposited into and withdrawn from a safe for a given work day using an electronic transmission of deposit information to a cash information server. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive.

APPENDIX
Transaction By Business Date

| March | End of Day | A/C | Serial # | Alt Serial # |
|---|---|---|---|---|
| Mon 6th | $5,000 |  | 100 | 100 |
| Tues 7th |  | $2,000 | 100 | 101 |
| Tues 7th | $4,000 |  | 101 | 101 |
| Wed 8th | $7,000 |  | 101 | 101 |
| Thurs 9th |  | $3,000 | 101 | 102 |
| Thurs 9th | $5,000 |  | 102 | 102 |
| Fri 10th | $4,000 |  | 102 | 102 |
| Sat 11th |  | $1,000 | 102 | 103 |
| Sat 11th | $4,000 |  | 103 | 103 |
| Sun 12th | $6,000 |  | 103 | 103 |
| Mon 13th | $9,000 |  | 103 | 103 |
| Tues 14th |  | $4,000 | 103 | 104 |
| Tues 14th | $2,000 |  | 104 | 104 |
| Wed 15th | $8,000 |  | 104 | 104 |
| Thurs 16th |  | $2,000 | 104 | 105 |
| Thurs 16th | $3,000 |  | 105 | 105 |
| Fri 17th | $9,000 |  | 105 | 105 |
| Sat 18th |  | $6,000 | 105 | 106 |
| Sat 18th | $1,000 |  | 106 | 106 |
| Sun 19th | $7,000 |  | 106 | 106 |
| Mon 20th | $9,000 |  | 106 | 106 |
| Tues 21st |  | $2,000 | 106 | 107 |
| Tues 21st | $6,000 |  | 107 | 107 |

DAILY FILE

| Business Date | Acceptor Cash | Serial # | Alt Serial # | Food Stamp | Manual Cash Drops | Checks |
|---|---|---|---|---|---|---|
| Daily File on 3/7 | | | | | | |
| 3/6 | $5,000 | 100 | 100 | | | |
| Daily File on 3/8 | | | | | | |
| 3/7 | $2,000 | 100 | 101 | | | |
| 3/7 | $4,000 | 101 | 101 | | | |
| Daily File on 3/9 | | | | | | |
| 3/8 | $7,000 | 101 | 101 | | | |
| Daily File on 3/10 | | | | | | |
| 3/9 | $3,000 | 101 | 102 | | | |
| 3/9 | $5,000 | 102 | 102 | | | |
| Daily File on 3/13 | | | | | | |
| 3/10 | $4,000 | 102 | 102 | | | |
| 3/11 | $1,000 | 102 | 103 | | | |
| 3/11 | $4,000 | 103 | 103 | | | |
| 3/12 | $6,000 | 103 | 103 | | | |
| Daily File on 3/14 | | | | | | |
| 3/13 | $9,000 | 103 | 103 | | | |
| Daily File on 3/15 | | | | | | |
| 3/14 | $4,000 | 103 | 104 | | | |
| 3/14 | $2,000 | 104 | 104 | | | |
| Daily File on 3/16 | | | | | | |
| 3/15 | $8,000 | 104 | 104 | | | |
| Daily File on 3/17 | | | | | | |
| 3/16 | $2,000 | 104 | 105 | | | |
| 3/16 | $3,000 | 105 | 105 | | | |
| Daily File on 3/20 | | | | | | |
| 3/17 | $9,000 | 105 | 105 | | | |
| 3/18 | $6,000 | 105 | 106 | | | |
| 3/18 | $1,000 | 106 | 106 | | | |
| 3/19 | $7,000 | 106 | 106 | | | |
| Daily File on 3/21 | | | | | | |
| 3/20 | $9,000 | 106 | 106 | | | |
| Daily File on 3/22 | | | | | | |
| 3/21 | $2,000 | 106 | 107 | | | |
| 3/21 | $6,000 | 107 | 107 | | | |

Verified File

| Business Date | Verified Acceptor Cash | Serial # | Alt Serial # | Deposit Date | Food Stamps | Manual Cash Drops |
|---|---|---|---|---|---|---|
| Pick Up 7th | | | | | | |
| Verified File on 3/9 | | | | | | |
| 3/6 | $5,000 | 100 | 100 | 3/8 | | |
| 3/7 | $2,000 | 100 | 101 | 3/8 | | |
| Pick Up 9th | | | | | | |
| Verified File on 3/13 | | | | | | |
| 3/7 | $4,000 | 101 | 101 | 3/10 | | |
| 3/8 | $7,000 | 101 | 101 | 3/10 | | |
| 3/9 | $3,000 | 101 | 102 | 3/10 | | |
| Pick Up 11th | | | | | | |
| Verified File on 3/14 | | | | | | |
| 3/9 | $5,000 | 102 | 102 | 3/13 | | |
| 3/10 | $4,000 | 102 | 102 | 3/13 | | |
| 3/11 | $1,000 | 102 | 103 | 3/13 | | |
| Pick Up 14th | | | | | | |
| Verified File on 3/16 | | | | | | |
| 3/11 | $4,000 | 103 | 103 | 3/15 | | |
| 3/12 | $6,000 | 103 | 103 | 3/15 | | |
| 3/13 | $9,000 | 103 | 103 | 3/15 | | |
| 3/14 | $4,000 | 103 | 104 | 3/15 | | |

-continued

| | Verified File | | | | |
|---|---|---|---|---|---|
| Business Date | Verified Acceptor Cash | Serial # | Alt Serial # | Deposit Date | Food Stamps | Manual Cash Drops |
| Pick Up 16th Verified File on 3/20 | | | | | |
| 3/14 | $2,000 | 104 | 104 | 3/17 | | |
| 3/15 | $8,000 | 104 | 104 | 3/17 | | |
| 3/16 | $2,000 | 104 | 105 | 3/17 | | |
| Pick Up 18th Verified File on 3/21 | | | | | |
| 3/16 | $3,000 | 105 | 105 | 3/20 | | |
| 3/17 | $9,000 | 105 | 105 | 3/20 | | |
| 3/18 | $6,000 | 105 | 106 | 3/20 | | |
| Pick Up 21st Verified File on 3/23 | | | | | |
| 3/18 | $1,000 | 106 | 106 | 3/22 | | |
| 3/19 | $7,000 | 106 | 106 | 3/22 | | |
| 3/20 | $9,000 | 106 | 106 | 3/22 | | |
| 3/21 | $2,000 | 106 | 107 | 3/22 | | |

What is claimed is:

1. A cash control system for a business establishment having one or more cash registers, the cash control system comprising:
a safe assembly including a safe adapted to secure cash and a currency reader coupled to the safe and programmed to determine an amount of cash received in the safe;
a memory in which a control software is stored, the control software programmed to update a pair of identifiers that distinguish deposit information accumulated only during an accounting period before a predetermined event and deposit information accumulated during an accounting period that includes a period after the predetermined event;
a central control unit which receives deposit information from the safe assembly and generates and transmits deposit reports, the central control unit uses the control software to update and transmit the pair of identifiers, the central control unit comprising:
means for detecting the predetermined event used to determine the accounting period before the predetermined event;
means for detecting the accounting period that includes the period after the predetermined event; and
means for generating, using the control software and based on the detected predetermined event and the accounting period that includes the period after the predetermined event, the pair of identifiers to indicate whether the deposit information was accumulated only during the accounting period before the predetermined event or during the accounting period that includes the period after the predetermined event by making the identifiers to be different from one another or to be identical to each other, wherein the pair of identifiers do not contain values including a date and/or a time of the predetermined event; and
a cash information server configured to receive the deposit information and the pair of identifiers from the central control unit and to identify the amount of cash collected by the business establishment during the accounting periods.

2. The cash control system of claim 1 further comprising a printer with a bar code generator coupled to the central control unit.

3. The cash control system of claim 1 further comprising a MICR line reader coupled to the central control unit to read MICR line information, the central control unit configured to transmit the MICR line information to the cash information server.

4. The cash control system of claim 1 further comprising at least one additional safe assembly including a second safe adapted to secure cash and a currency reader coupled to the second safe adapted to determine a second amount of cash received in the second safe and wherein the central control unit is configured to receive deposit information from the additional safe assembly and transmit deposit reports to the cash information server containing the deposit information received from the additional safe assembly.

5. The cash control system of claim 1 wherein the safe is associated with a unique number which is included in the deposit reports transmitted by the central control unit.

6. The cash control system of claim 5 wherein the central control unit is configured to identify when the safe is opened and the cash stored in the safe is removed.

7. The cash control system of claim 6 wherein the identifiers are a sequence number and an alternate sequence number, wherein the central control unit is configured to adjust at least one of the sequence number and the alternate sequence number based on removal of the cash from the safe.

8. The cash control system of claim 7 wherein one of the accounting periods is a business day as identified by a store manager.

9. The cash control system of claim 8, wherein the predetermined event is the opening of the safe and the cash stored in the safe removed and wherein the central control unit is configured to change one of the sequence number and the alternate sequence number at the time cash is removed from the safe and to change the other of the sequence number and the alternate sequence number at an end of the business day.

10. The cash control system of claim 9 wherein the central control unit is configured to transmit a first deposit report that identifies deposit information for the business day up to the time of removal of cash from the safe and wherein the sequence number and the alternate sequence number are different on the first deposit report and wherein the central control unit is configured to transmit a second deposit report that identifies deposit information for the business day starting from removal of cash from the safe and wherein the sequence number and the alternate sequence number are the same on the second deposit report.

11. The cash control system of claim 1, wherein the pair of identifiers distinguish the deposit information accumulated only during the accounting period before the predetermined event and deposit information accumulated only during an accounting period after the predetermined event.

12. The cash control system of claim 1, further comprising a transmitter for transmitting the pair of identifiers.

13. A cash control system for a business establishment having one or more cash registers, the cash control system comprising:
a safe assembly to collect cash, and to determine deposit information based on the cash collected at the business establishment;
a memory in which a control software is stored, the control software programmed to update a sequence number and an alternate sequence number such that the sequence number and the alternate sequence number are successively the same as or different from each other;

a central control unit which receives the deposit information from the safe assembly, generates a deposit report concerning the deposit information, updates, using the control software, the sequence number and the alternate sequence number, and transmits the deposit report, the sequence number and the alternate sequence number, the central control unit comprising:

means for detecting an armored car pickup; and means for updating the alternate sequence number when the armored car pickup is detected to indicate an occurrence of the armored car pickup, wherein the sequence number and the alternate sequence number do not contain any date and/or time information;

a cash information server which receives the deposit information, the sequence number and the alternate sequence number from the central control unit, and identifies an amount of cash collected at the business establishment before and after the armored car pickup using the deposit information, the sequence number and the alternate sequence number; and wherein the central control unit further comprises means for updating the sequence number at an end of a business day on which the armored car pickup occurred to match the alternate sequence number.

14. The cash control system of claim 13, wherein the alternate sequence number is incremented upon the occurrence of the armored car pickup, and the sequence number is incremented at the end of the business day on which the armored car pickup occurred to match the incremented alternate sequence number.

15. The cash control system of claim 13, wherein the system generates a print-out that includes the deposit information, a store number, the sequence number and the alternate sequence number after the occurrence of the armored car pickup.

* * * * *